(12) United States Patent
Small et al.

(10) Patent No.: US 9,484,707 B2
(45) Date of Patent: Nov. 1, 2016

(54) SPATIALLY STABLE HIGH BRIGHTNESS FIBER

(71) Applicant: nLight Photonics Corporation, Vancouver, WA (US)

(72) Inventors: Jay Small, Vancouver, WA (US); Ken Gross, Vancouver, WA (US); Shuang Li, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 14/144,408

(22) Filed: Dec. 30, 2013

(65) Prior Publication Data

US 2014/0185644 A1 Jul. 3, 2014

Related U.S. Application Data

(60) Provisional application No. 61/747,812, filed on Dec. 31, 2012.

(51) Int. Cl.
  *G02B 6/028* (2006.01)
  *H01S 3/094* (2006.01)
  *H01S 3/0941* (2006.01)

(52) U.S. Cl.
  CPC ....... *H01S 3/094053* (2013.01); *G02B 6/0288* (2013.01); *H01S 3/0941* (2013.01)

(58) Field of Classification Search
  CPC .......... G02B 6/03644; G02B 6/03627; G02B 6/0281; G02B 6/03611; G02B 6/028
  USPC ........ 385/115, 121, 122, 123, 124, 125, 126
  See application file for complete search history.

(56) References Cited

U.S. PATENT DOCUMENTS

| 3,505,046 A | 4/1970 | Phaneuf |
| 4,046,537 A | 9/1977 | Deserno et al. |
| 4,072,399 A | 2/1978 | Love |
| 4,087,159 A | 5/1978 | Ulrich |
| 4,179,185 A | 12/1979 | Hawk |
| 4,773,924 A | 9/1988 | Berkey |
| 4,818,062 A | 4/1989 | Scifres et al. |
| 4,871,487 A | 10/1989 | Laursen |
| 5,011,251 A | 4/1991 | Miller et al. |

(Continued)

FOREIGN PATENT DOCUMENTS

| RU | 2176840 C2 | 12/2001 |
| WO | WO 92/10014 | 6/1992 |

(Continued)

OTHER PUBLICATIONS

Jauregui et al., "All-Fiber Side Pump Combiner for High Power Fiber Lasers and Amplifiers," Proc. of SPIE, 7580:75801E-1-75801E-8 (2010).

(Continued)

*Primary Examiner* — Jennifer Doan
(74) *Attorney, Agent, or Firm* — Klarquist Sparkman, LLP

(57) ABSTRACT

Optical fibers that provide stable output beam sizes have core refractive indices that decrease non-monotonically from a core center to a core/cladding interface. A maximum refractive index of the core is situated at a radius of between about ½ and ¾ of the core radius so that a core center has a depressed refractive index. Such fibers are included in diode pumped solid state lasers to deliver pump laser power to a laser medium.

27 Claims, 5 Drawing Sheets

(56) References Cited

U.S. PATENT DOCUMENTS

| | | |
|---|---|---|
| 5,017,206 A | 5/1991 | Miller et al. |
| 5,153,932 A | 10/1992 | Blyler, Jr. et al. |
| 5,239,176 A | 8/1993 | Stevenson |
| 5,259,046 A | 11/1993 | DiGiovanni et al. |
| 5,295,210 A | 3/1994 | Nolan et al. |
| 5,295,211 A | 3/1994 | Weidman |
| 5,305,414 A | 4/1994 | Higby et al. |
| 5,408,554 A | 4/1995 | Cryan et al. |
| 5,448,673 A | 9/1995 | Murphy et al. |
| 5,461,692 A | 10/1995 | Nagel |
| 5,568,318 A | 10/1996 | Leger et al. |
| 5,579,422 A | 11/1996 | Head et al. |
| 5,629,997 A | 5/1997 | Hardy |
| 5,664,037 A | 9/1997 | Weidman |
| 5,668,903 A | 9/1997 | Neuberger et al. |
| 5,715,270 A | 2/1998 | Zediker |
| 5,729,643 A | 3/1998 | Hmelar et al. |
| 5,734,766 A | 3/1998 | Flint |
| 5,745,284 A | 4/1998 | Goldberg et al. |
| 5,818,630 A | 10/1998 | Fermann et al. |
| 5,825,803 A | 10/1998 | Labranche |
| 5,864,644 A | 1/1999 | DiGiovanni et al. |
| 5,867,305 A | 2/1999 | Waarts et al. |
| 5,873,923 A | 2/1999 | DiGiovanni |
| 5,887,097 A | 3/1999 | Henry et al. |
| 5,935,288 A | 8/1999 | DiGiovanni et al. |
| 5,949,932 A | 9/1999 | Lawrenz-Stolz |
| 6,031,953 A | 2/2000 | Rekow et al. |
| 6,044,096 A | 3/2000 | Wolak et al. |
| 6,078,716 A | 6/2000 | Huang et al. |
| 6,101,199 A | 8/2000 | Wang et al. |
| 6,134,362 A | 10/2000 | Au-Yeung et al. |
| 6,198,858 B1 | 3/2001 | Pan et al. |
| 6,272,268 B1 | 8/2001 | Miller et al. |
| 6,278,816 B1 | 8/2001 | Keur et al. |
| 6,292,608 B1 | 9/2001 | Toh |
| 6,373,868 B1* | 4/2002 | Zhang ............................ 372/19 |
| 6,385,371 B1 | 5/2002 | Li |
| 6,397,636 B1 | 6/2002 | DiGiovanni et al. |
| 6,404,954 B1 | 6/2002 | Zhu et al. |
| 6,421,489 B1 | 7/2002 | Berkey et al. |
| 6,434,295 B1 | 8/2002 | MacCormack et al. |
| 6,434,302 B1 | 8/2002 | Fidric et al. |
| 6,477,295 B1 | 11/2002 | Lang et al. |
| 6,496,301 B1 | 12/2002 | Koplow et al. |
| 6,516,124 B2 | 2/2003 | Po |
| 6,532,244 B1 | 3/2003 | Dewey et al. |
| 6,608,951 B1 | 8/2003 | Goldberg et al. |
| 6,666,590 B2 | 12/2003 | Brosnan |
| 6,668,112 B1 | 12/2003 | Kaneda |
| 6,700,709 B1 | 3/2004 | Fermann |
| 6,731,837 B2 | 5/2004 | Goldberg et al. |
| 6,778,732 B1 | 8/2004 | Fermann |
| 6,816,652 B1 | 11/2004 | Lin et al. |
| 6,868,236 B2 | 3/2005 | Wiltsey et al. |
| 6,907,163 B2 | 6/2005 | Lewis |
| 6,956,876 B1 | 10/2005 | Aquaro et al. |
| 6,970,624 B2 | 11/2005 | DiGiovanni et al. |
| 6,990,278 B2 | 1/2006 | Vakili et al. |
| 7,016,573 B2 | 3/2006 | Dong et al. |
| 7,046,432 B2 | 5/2006 | Starodoumov |
| 7,046,875 B2 | 5/2006 | Gonthier et al. |
| 7,209,615 B2 | 4/2007 | Fishteyn |
| 7,221,822 B2 | 5/2007 | Grudinin et al. |
| 7,236,671 B2 | 6/2007 | Rasmussen |
| 7,272,956 B1 | 9/2007 | Anikitchev et al. |
| 7,327,920 B2 | 2/2008 | Dong et al. |
| 7,336,872 B1* | 2/2008 | Malo ............................ 385/37 |
| 7,343,074 B1 | 3/2008 | Gallagher et al. |
| 7,420,996 B2 | 9/2008 | Schulte et al. |
| 7,436,868 B2 | 10/2008 | Schulte et al. |
| 7,437,046 B2 | 10/2008 | DiGiovanni et al. |
| 7,443,895 B2 | 10/2008 | Schulte et al. |
| 7,526,165 B2 | 4/2009 | Nielsen et al. |
| 7,532,792 B2 | 5/2009 | Skovaard et al. |
| 7,539,377 B2 | 5/2009 | Gonthier |
| 7,561,769 B2 | 7/2009 | Fujimoto et al. |
| 7,574,087 B2 | 8/2009 | Inoue et al. |
| 7,586,963 B2 | 9/2009 | Schulte et al. |
| 7,606,452 B2 | 10/2009 | Bilodeau et al. |
| 7,637,126 B2 | 12/2009 | Koeppler et al. |
| 7,729,574 B2 | 6/2010 | Moriarty |
| 7,746,545 B2 | 6/2010 | Okuno |
| 7,760,978 B2 | 7/2010 | DiGiovanni et al. |
| 7,787,733 B2 | 8/2010 | DiGiovanni et al. |
| 7,957,432 B2 | 6/2011 | Seo et al. |
| 7,991,255 B2 | 8/2011 | Salokative |
| 8,068,705 B2 | 11/2011 | Gapontsev et al. |
| 8,213,070 B2 | 7/2012 | Koplow |
| 8,248,688 B2 | 8/2012 | Baird et al. |
| 8,346,038 B2 | 1/2013 | Gonthier |
| 8,433,168 B2 | 4/2013 | Filippov et al. |
| RE44,262 E | 6/2013 | Gonthier et al. |
| 8,457,456 B2 | 6/2013 | Kopp et al. |
| 8,472,765 B2 | 6/2013 | Holland et al. |
| 8,483,533 B1 | 7/2013 | Mehl |
| 8,498,046 B2 | 7/2013 | Dong et al. |
| 8,711,471 B2 | 4/2014 | Liu et al. |
| 2002/0172486 A1 | 11/2002 | Fermann |
| 2003/0021530 A1 | 1/2003 | Li |
| 2003/0031442 A1 | 2/2003 | Siegman |
| 2004/0228593 A1 | 11/2004 | Sun et al. |
| 2005/0008044 A1 | 1/2005 | Fermann et al. |
| 2005/0041702 A1 | 2/2005 | Fermann et al. |
| 2005/0226286 A1 | 10/2005 | Liu et al. |
| 2005/0265653 A1 | 12/2005 | Cai et al. |
| 2005/0265678 A1 | 12/2005 | Manyam et al. |
| 2005/0276556 A1 | 12/2005 | Williams et al. |
| 2006/0215976 A1 | 9/2006 | Singh et al. |
| 2007/0062222 A1 | 3/2007 | Janka et al. |
| 2007/0086501 A1 | 4/2007 | Karlsen |
| 2007/0116071 A1 | 5/2007 | Schulte et al. |
| 2007/0116077 A1 | 5/2007 | Farmer et al. |
| 2007/0196062 A1 | 8/2007 | Inoue et al. |
| 2007/0237453 A1 | 10/2007 | Nielsen et al. |
| 2007/0266738 A1 | 11/2007 | Gallagher et al. |
| 2007/0280597 A1 | 12/2007 | Nakai et al. |
| 2008/0050069 A1 | 2/2008 | Skovgaard et al. |
| 2008/0063348 A1 | 3/2008 | Kumano et al. |
| 2008/0118213 A1* | 5/2008 | Andrieu ............ G02B 6/02038 385/127 |
| 2008/0166094 A1 | 7/2008 | Bookbinder et al. |
| 2008/0170823 A1 | 7/2008 | Gonthier |
| 2008/0205840 A1 | 8/2008 | Wakabayashi et al. |
| 2009/0003788 A1 | 1/2009 | Galvanauskas |
| 2009/0010286 A1 | 1/2009 | Messaddeq et al. |
| 2009/0052840 A1 | 2/2009 | Kojima et al. |
| 2009/0060417 A1 | 3/2009 | Bilodeau et al. |
| 2009/0092365 A1 | 4/2009 | Donlagic |
| 2009/0136176 A1 | 5/2009 | Kopp et al. |
| 2009/0202204 A1 | 8/2009 | Nielsen et al. |
| 2010/0111118 A1 | 5/2010 | Seo et al. |
| 2010/0142894 A1 | 6/2010 | Gonthier |
| 2010/0247047 A1 | 9/2010 | Filippov et al. |
| 2010/0278486 A1 | 11/2010 | Holland |
| 2011/0032602 A1 | 2/2011 | Rothenberg |
| 2011/0032603 A1 | 2/2011 | Rothenberg |
| 2011/0032604 A1 | 2/2011 | Rothenberg et al. |
| 2011/0058250 A1 | 3/2011 | Liu et al. |
| 2011/0069723 A1 | 3/2011 | Dong et al. |
| 2011/0100066 A1 | 5/2011 | Bohme et al. |
| 2011/0157671 A1 | 6/2011 | Koplow |
| 2011/0305250 A1 | 12/2011 | Chann et al. |
| 2012/0127563 A1 | 5/2012 | Farmer et al. |
| 2012/0219026 A1 | 8/2012 | Saracco et al. |
| 2012/0230352 A1 | 9/2012 | Minelly et al. |
| 2012/0260781 A1 | 10/2012 | Gass et al. |
| 2013/0287338 A1 | 10/2013 | Majid et al. |
| 2014/0119694 A1 | 5/2014 | Abedin et al. |

FOREIGN PATENT DOCUMENTS

| | | |
|---|---|---|
| WO | WO 97/42533 | 11/1997 |
| WO | WO 2005/022705 | 3/2005 |

(56) References Cited

FOREIGN PATENT DOCUMENTS

| WO | WO 2009/043968 | 4/2009 |
|----|----------------|--------|
| WO | WO 2011/066440 | 6/2011 |
| WO | WO 2013/102033 | 7/2013 |

OTHER PUBLICATIONS

"Pump and Signal Taper for Airclad Fibers Final Report," Air Force Research Laboratory, 8 pages (May 1, 2006).

Eidam et al., "Femtosecond fiber CPA system emitting 830 W average output power," Opt. Lett. 35:94-96 (2010).

Geshiro et al., "Analysis of wave modes in slab waveguide with truncate parabolic index," IEEE Jouranl of Quantum Electronics, 10(9):647-649, 1974.

Geshiro et al., "Truncated parabolic-index fiber with minimum mode dispersion," IEEE Transaction on Microwave Theory and Technology, 26(2):115-119, 1978.

International Search Report from International Application No. PCT/US2013/030569, dated Jul. 4, 2013, 3 pp.

International Search Report from International Application No. PCT/US2012/072003, dated Apr. 4, 2013, 2 pp.

Niels Asger Mortensen, "Air-clad fibers: pump absorption assisted by chaotic wave dynamics?," Optics Express, vol. 15, No. 14, Jul. 9, 2007 (published Jul. 5, 2007).

nLIGHT Corporation, "nLIGHT Introduces New Line of All Fiber Mode Field Tapers" Jan. 23, 2009 News Release, http://nlight.net/new/releases/92~nLIGHT-Introduces-New-Line-of-All-Fiber-Mode-Field, downloaded Jan. 18, 2014.

nLIGHT, spreadsheet listing order dates for tapers.

Russbueldt et al., "400 W Yb:YAG Innoslab fs-amplifier," Optics Express, vol. 17(15):12230-12245 (2009).

Stolzenburg et al., "Picosecond Regenerative Yb:YAG Thin Disk Amplifier at 200 kHz Repetition Rate and 62 W Output Power," Advanced Solid-State Photonics, OSA Tech Digest, MA6 (2007).

Written opinion from International Application No. PCT/US2012/072003, dated Apr. 4, 2013, 3 pp.

Written Opinion from International Application No. PCT/US2013/030569, dated Jul. 4, 2013, 5 pp.

International Search Report from PCT Publication No. PCT/US2013/077242, 2pp. (dated May 22, 2014).

International Search Report from PCT Publication No. PCT/US2013/077243, 2pp. (dated Apr. 17, 2014).

Written Opinion from PCT Publication No. PCT/US2013/077242, 4pp. (dated May 22, 2014).

Written Opinion from PCT Publication No. PCT/US2013/077243, 4pp. (dated Apr. 17, 2014).

\* cited by examiner

SPATIALLY STABLE HIGH BRIGHTNESS FIBER

CROSS REFERENCE TO RELATED APPLICATION

This application claims the benefit of U.S. Provisional Patent Application 61/747,812, filed Dec. 31, 2012, which is incorporated herein by reference.

FIELD

The disclosure pertains to fiber optic beam delivery systems and fibers for use in such systems.

BACKGROUND

Optical fibers permit convenient delivery of optical beams in a variety of applications. The flexibility of optical fibers enables access to difficult locations, and fiber optic connectors permit fiber replacement without complex optical system realignments that are especially challenging in installed equipment. Optical fibers are inexpensive, and many different fiber designs are commercially available.

Optical fiber-based beam delivery systems tend to produce output beam variations such an unstable beam size, divergence angle, beam position, or beam power. FIGS. 1A-1C are refractive index profiles of several fiber types that can be used. Step index fibers (FIG. 1A) tend to exhibit relatively small variations in output beam diameter but up to about 20% variation in beam divergence. In addition, step index fibers typically provide 20-30% less output power than that available with a gradient index design such as those of FIGS. 1B-1C. Fibers having a refractive index profile similar to that of FIG. 1C tend to produce higher power output beams that vary in position, divergence, and diameter. For example, beam size variations of 20% are possible.

In many applications, output power from an optical fiber must be focused to a particular diameter at a particular location with a particular beam divergence. Variation in diameter, power, or position can result in unacceptable power losses or power variations. In high power applications, such variability can result in optically induced damage to one or more optical components. For these reasons, improved beam delivery methods and apparatus are needed.

SUMMARY

Optical fibers are configured to provide reduced variation in output beam spot size in response to offset errors at a fiber input surface. In some examples, optical fibers comprise a core having a refractive index that decreases from a maximum value at a core radial coordinate $r_{max}$ to a core center and to a core radius $r_{core}$, and a cladding is situated about the core. A refractive index difference associated with the radial coordinate $r_{max}$ and the core center is less than about 0.01, and $r_{max}$ is between 0.25 $r_{core}$ and 0.75 $r_{core}$. In typical examples, a refractive index difference associated with the radial coordinate $r_{max}$ and the core center is less than about 0.007, and $r_{max}$ is between 0.5 $r_{core}$ and 0.65 $r_{core}$. According to some examples, the refractive index difference associated with the radial coordinate $r_{max}$ and the core center is less than about 0.005, and the core radius is between 12.5 μm and 500 μm or between 150 μm and 250 μm. In other embodiments, an absolute value of a refractive index gradient at a core/cladding interface is greater than $0.05/r_{core}$ or $0.2/r_{core}$. In yet other examples, a refractive index in a central core cross sectional area having a radius of at least ¼ or ½ of the core radius is less than a maximum core refractive index.

Solid optical waveguides comprise a core and a cladding surrounding the core, wherein a core refractive index decreases non-monotonically from a core center to a core/cladding interface. In some examples, the core has a rectangular cross section having a length to width ratio of between 1 and 5. In representative examples, the core refractive index decreases non-monotonically from the core center to the core/cladding interface along a direction parallel to a length or width of the rectangular cross section. In some examples, a total variation in core refractive index is less than 0.05. In some examples, the core and cladding are silica, and the core refractive index decreases monotonically from a core center to a maximum at between 0.5 and 0.75 times a width or length of the rectangular cross-section. In other examples, the core refractive index decreases non-monotonically from the core center to a core/cladding interface so as to form a spot-stabilized waveguide with respect to input beam displacements along at least one axis.

Diode pumped solid state lasers comprise a pump laser array configured to produce a pump beam and a spot-stabilized fiber configured to receive the pump beam and direct the pump beam to a solid state laser material. According to some examples, a beam shaping optical system is configured to receive the pump beam from the spot-stabilized fiber and direct the shaped pump beam to the solid state laser material. In further examples, at least one fiber optic connector is configured to retain the spot-stabilized fiber so as to receive the pump beam or couple the pump beam to the beam shaping optical system. In still further examples, the spot-stabilized fiber has a core diameter of 125 μm to 500 μm, and a refractive index difference associated with a radial coordinate $r_{max}$ and the core center is less than about 0.01, and $r_{max}$ is between 0.25 $r_{core}$ and 0.75 $r_{core}$, wherein $r_{core}$ is a core radius. In other examples, the spot-stabilized fiber has a cladding surrounding a core, and a core refractive index decreases non-monotonically from a core center to a core/cladding interface.

The foregoing and other objects, features, and advantages of the disclosed technology will become more apparent from the following detailed description, which proceeds with reference to the accompanying figures.

DETAILED DESCRIPTION

Figure 1A:
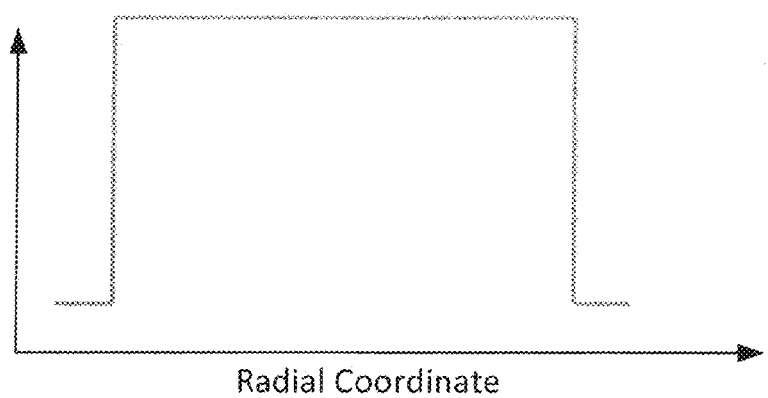
FIGS. 1A-1C are graphs of refractive index as a function of radial coordinate for three types of optical fibers.

The following disclosure is presented in the context of representative embodiments that are not to be construed as being limiting in any way. This disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Although the operations of the disclosed methods are described in a particular, sequential order for convenient presentation, it should be understood that this manner of description encompasses rearrangement of the operations, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other things and methods.

This disclosure sometimes uses terms like "produce," "generate," "select," "receive," "exhibit," and "provide" to describe the disclosed methods. These terms are high-level abstractions of the actual operations that are performed. The actual operations that correspond to these terms may vary depending on the particular implementation and are readily discernible by one of ordinary skill in the art.

The singular forms "a," "an," and "the" include the plural forms unless the context clearly dictates otherwise. The term "includes" means "comprises." Unless the context dictates otherwise, the term "coupled" means mechanically, electrically, or electromagnetically connected or linked and includes both direct connections or direct links and indirect connections or indirect links through one or more intermediate elements not affecting the intended operation of the described system.

Certain terms may be used such as "up," "down," "upper," "lower," and the like. These terms are used, where applicable, to provide some clarity of description when dealing with relative relationships. But, these terms are not intended to imply absolute relationships, positions, and/or orientations.

The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about" or "approximately." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Figure 1B:
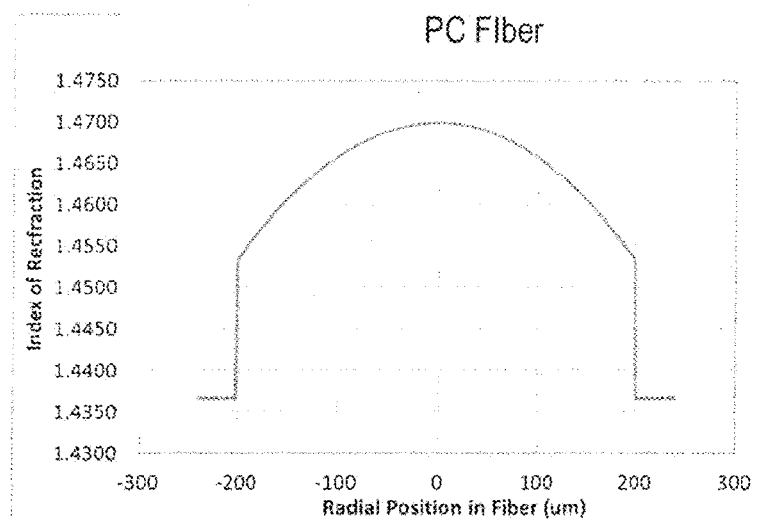
Figure 1C:
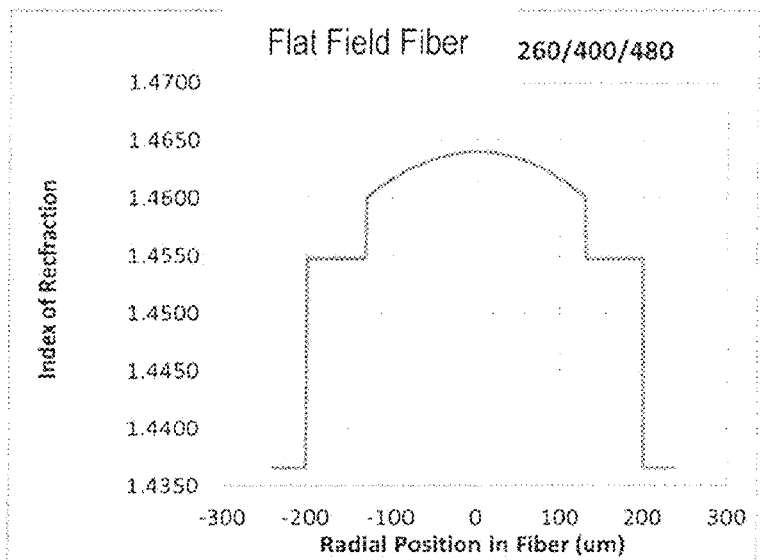

Disclosed herein are fiber beam delivery systems based on spot-stabilized fibers in which beam shape and size at a fiber output tend to be more stable than designs such as shown in FIGS. 1A-1C. Such fibers are typically intended for use at wavelengths between about 500 nm and 2000 nm, 600 nm and 1200 nm, or 750 nm and 1600 nm.

Figure 2:
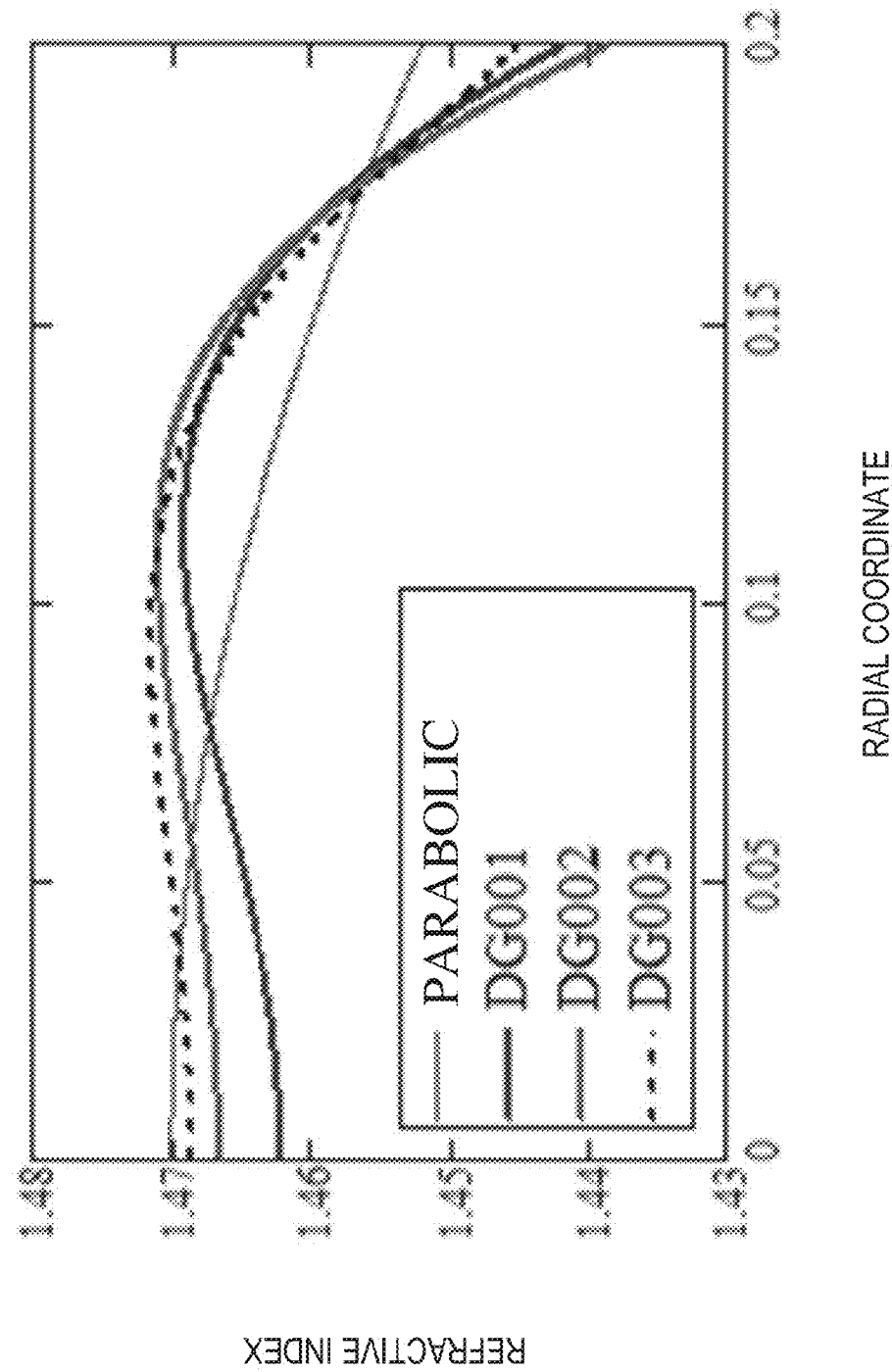
FIG. 2 is a graph of refractive index as a function of radial coordinate for three spot-stabilized fibers and a fiber such as that of FIG. 1B.

Representative refractive index profiles (DB001-DG003) for spot-stabilized fibers having 400 μm core diameters are illustrated in FIG. 2 along with a parabolic profile similar to that of FIG. 1B. The parabolic profile has a monotonically decreasing refractive index as a function of radial coordinate. The spot-stabilized profiles DG001-DG003 have refractive indices that increase and then decrease as a function of radial coordinate. A maximum refractive index for such a fiber having a core radius $r_{core}$ occurs at $r_{max}$, wherein $r_{max}$ is between $0.25r_{core}$ and $0.75r_{core}$, $0.4r_{core}$ and $0.7r_{core}$, $0.5r_{core}$ and $0.65r_{core}$, or $0.55r_{core}$ and $0.6r_{core}$. Total refractive index difference between r=0 and $r_{max}$ is less than about 0.01, 0.007, 0.005, 0.003, 0.002, or 0.001 in fibers with an average refractive index of between 1.4 and 1.6. Cladding refractive indices and index differences with respect to core refractive index at a core/cladding interface can be the same or similar to those of FIGS. 1A-1C.

The refractive index profiles of FIG. 2 are shown as continuously varying, but step-wise variations can be used, with varying numbers of steps so as to approximate the continuous profiles. Other core diameters can be used with similar refractive index profiles, and a 400 μm core diameter is only a representative example.

Figure 3:
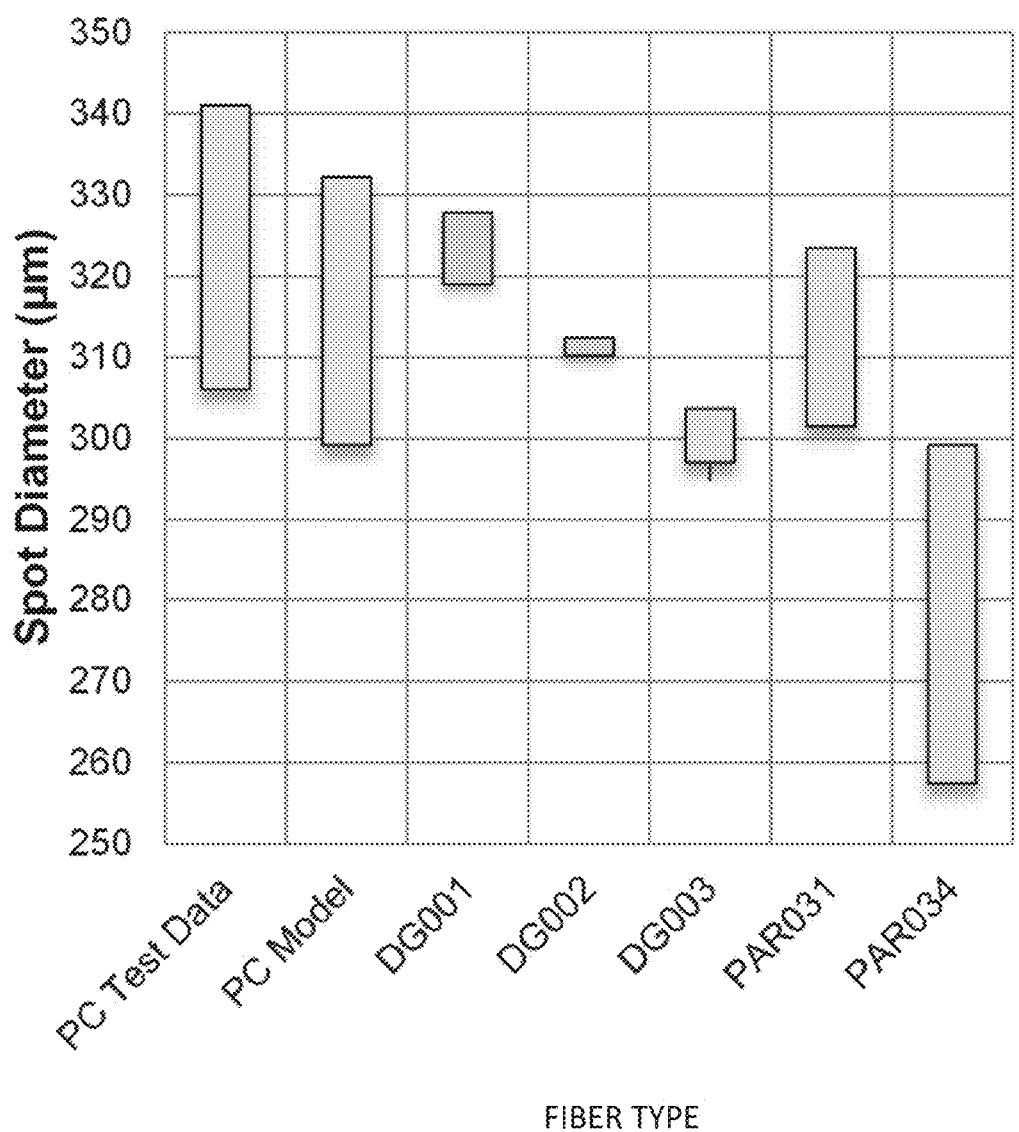
FIG. 3 is a graph illustrating variation in beam spot size at a fiber output surface as a function of beam offset at an input surface for a variety of fiber types based on measurements or model data.
Figure 4:
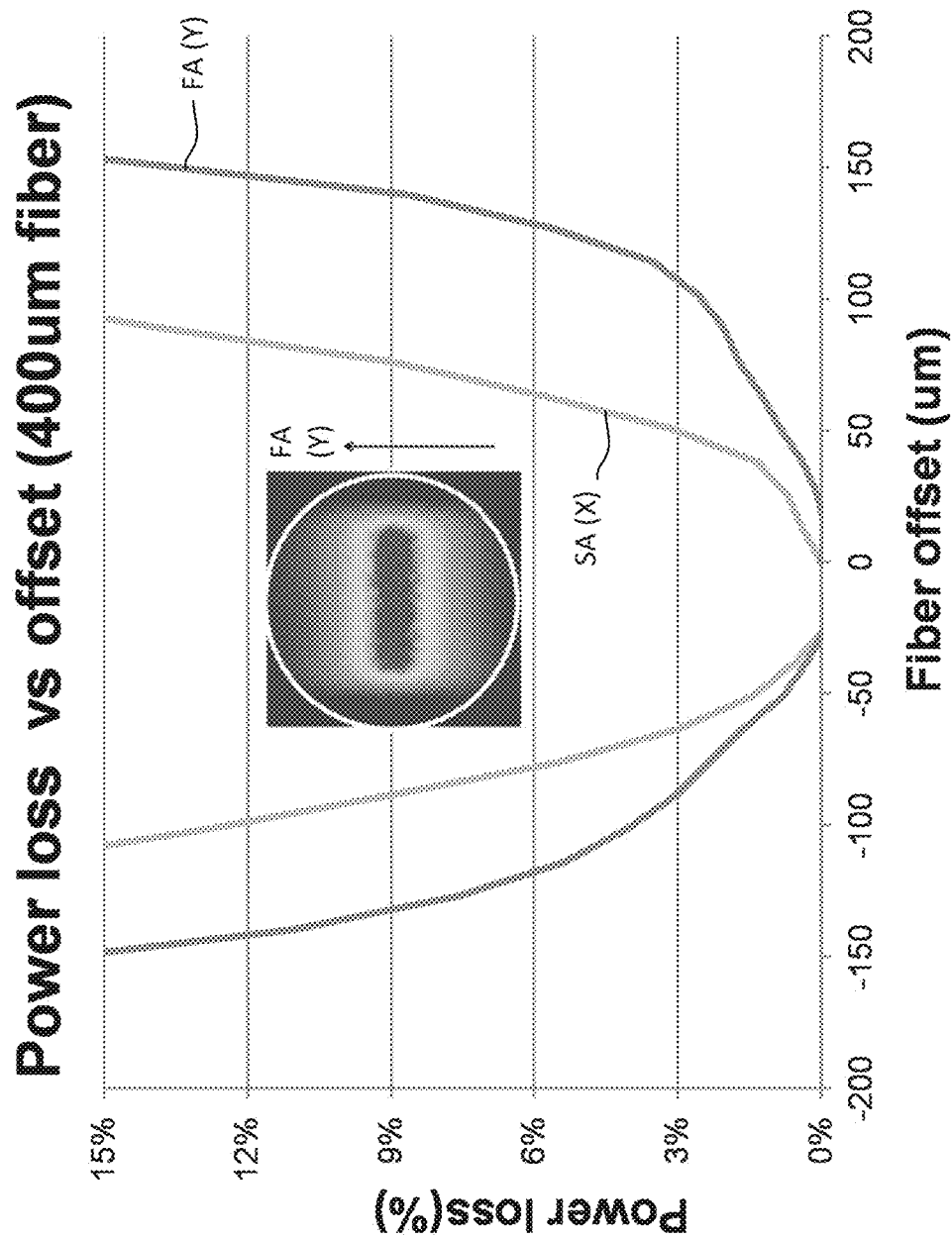
FIG. 4 illustrates power loss as a function of beam offset for an elongated beam along a fast axis (FA) and a slow axis (SA).

FIG. 3 illustrates variation in beam spot size at a fiber output surface as a function of input beam offset at a fiber input surface for 400 μm core diameters including fibers DG001-DG003 shown in FIG. 2. Beam spot size variations are predicted or measured based on an elongated laser beam as shown in the inset of FIG. 4. FIG. 4 also shows asymmetry in power loss as a function of offsets along a fast axis and a slow axis. Power loss is greater for offsets along the slow axis due to laser beam extension in this direction.

As shown in FIG. 3, fibers DG001-DG003 exhibit reduced beam spot size variation in comparison to other fibers. For example, the fiber DG002 has a total beam spot size variation of less than about 3.5 μm for the entire 0-80 μm offset range. The fibers DG001, DG003 have total beam spot size variations of less than 9 μm and 7 μm, respectively. In contrast, even the best of the other fiber designs (parabolic profile PAR031) exhibits about a 22 μm variation in beam spot size, with beam spot size variations for other fibers being as large as about 42 μm. Thus, the index profiles (DG001-DG003) of FIG. 2 can produce beam spot size variations of less than about 1%, 2%, 3%, 4%, or 5% for beam coupling offsets ranging up to 40% of a core radius.

Figure 5:
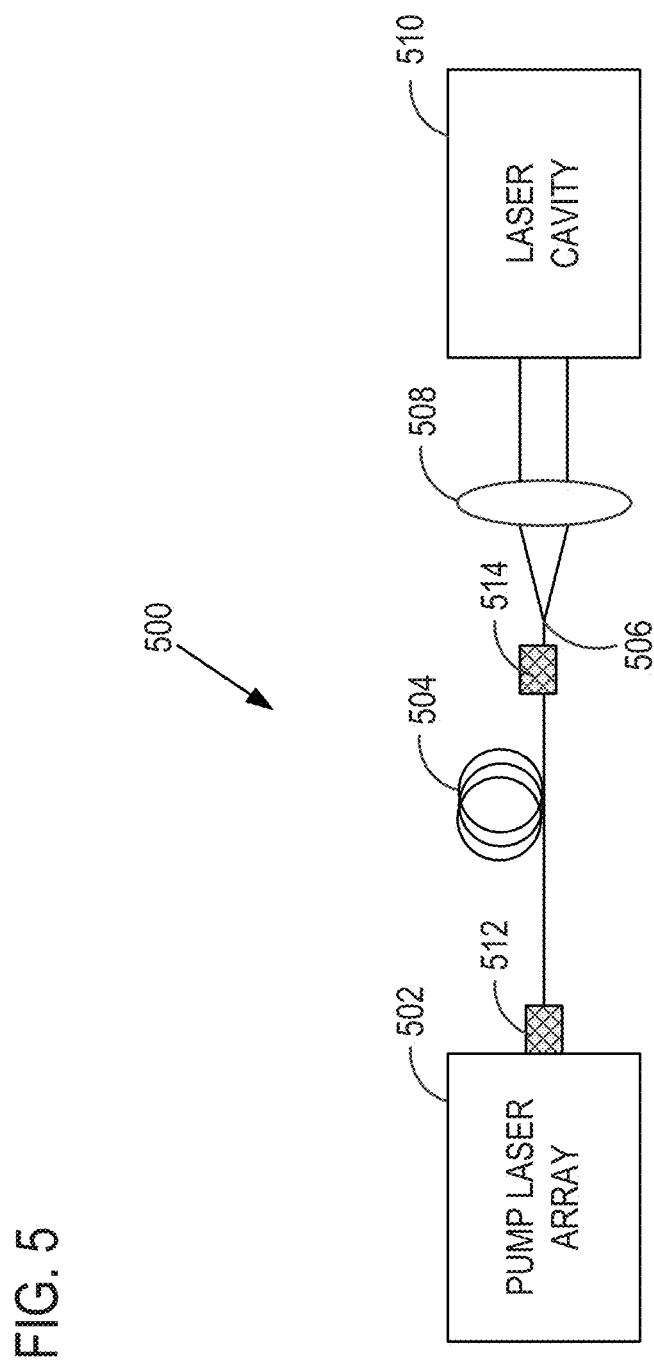
FIG. 5 is a block diagram of a diode pumped solid state laser (DPSSL) that includes a spot-stabilized fiber configured to deliver pump power to a laser cavity.

FIG. 5 illustrates a representative application of a spot-stabilized fiber. A diode pumped solid state laser (DPSSL) 500 includes a laser diode pump array 502 that is situated to couple a pump beam into a spot-stabilized fiber 504. The pump beam exits the spot-stabilized fiber 504 at a fiber end surface 506 and is coupled to a lens 508 or other beam shaping optical elements so as to direct the pump beam into a laser cavity 510 so as to produce optical gain in a laser medium. In other examples, the pump beam is directed to an active material situated to serve as an optical amplifier, and an optical cavity is not used.

For convenient assembly and service, the spot-stabilized fiber 504 is coupled to the laser diode pump array 502 and the lens 508 with fiber optic connectors 512, 514. With fiber designs other than spot-stabilized designs, pump power coupling can vary unacceptably with fiber replacement, and fiber connectors generally do not provide acceptably repeatable coupling. In addition, some portions of a high power, miscoupled pump beam can produce damage in one or more components. Typical spot-stabilized fibers for use in the DPSSL 500 have core diameters that range from 25 μm to 1 mm, and a 400 μm core diameter is typical. Fiber length can be selected as convenient, but typically is less than 10 m.

In other examples, solid waveguides having other cross sections can be used, such as rectangular, ovoid, elliptical, or polygonal. Refractive index variations such as shown in FIG. 2 can be provided along one or more axes. For example, such index variations can be applied along one or both of a width or length of a rectangle. Refractive index profiles can be specified numerically or analytically with power series or other functions. Radially and azimuthally symmetric profiles are convenient, but asymmetric profiles can be used. The disclosed spot-stabilized fibers can be fabricated with suitably doped preforms made using direct nanoparticle deposition or other methods. In some examples, lengths of spot-stabilized fibers are combined with conventional gradient index or step index fibers, and the spot-stabilized fibers used at a beam input to reduce beam spot size variations caused by beam offsets.

In view of the many possible embodiments to which the principles of the disclosure may be applied, it should be recognized that the illustrated embodiments are only preferred examples and should not be taken as limiting the scope of the disclosure. We therefore claim as our invention all that comes within the scope and spirit of the appended claims.

We claim:

1. An optical fiber, comprising:
a core having a refractive index that decreases monotonically along a core radius from a maximum value at a core radial coordinate $r_{max}$ to a core center and decreases monotonically along the core radius from the core radial coordinate $r_{max}$ to a core/cladding interface having a radial coordinate $r_{core}$; and
a cladding situated about the core.

2. The optical fiber of claim 1, wherein a refractive index difference associated with the radial coordinate $r_{max}$ and the core center is less than about 0.01, and $r_{max}$ is between 0.25 $r_{core}$ and 0.75 $r_{core}$.

3. The optical fiber of claim 1, wherein a refractive index difference associated with the radial coordinate $r_{max}$ and the core center is less than about 0.01, and $r_{max}$ is between 0.05 $r_{core}$ and 0.65 $r_{core}$.

4. The optical fiber of claim 1, wherein the refractive index difference associated with the radial coordinate $r_{max}$ and the core center is less than about 0.005.

5. The optical fiber of claim 4, wherein the core radius is between 12.5 μm and 500 μm.

6. The optical fiber of claim 4, wherein the core radius is between 150 μm and 250 μm.

7. The optical fiber of claim 1, wherein an absolute value of a refractive index gradient at a core/cladding interface is greater than $0.05/r_{core}$ or $0.2/r_{core}$.

8. The optical fiber of claim 1, wherein a refractive index in a central core cross section having a radius of at least ¼ of the core radius is less than a maximum core refractive index.

9. The optical fiber of claim 1, wherein a refractive index in a central core cross section having a radius of at least ½ of the core radius is less than a maximum core refractive index.

10. A solid optical waveguide, comprising:
a core; and
a cladding surrounding the core, wherein a core refractive index increases continuously from a core center and then decreases continuously to a core/cladding interface.

11. The solid optical waveguide of claim 10, wherein the core has a rectangular cross section having an aspect ratio of between 1 and 5.

12. The solid optical waveguide of claim 10, wherein the core refractive index decreases non-monotonically from the core center to the core/cladding interface along a direction parallel to a length or width of the rectangular cross section.

13. The solid optical waveguide of claim 10, wherein a total variation in core refractive index is less than 0.05.

14. The solid optical waveguide of claim 10, wherein the core and cladding are silica.

15. The solid optical waveguide of claim 10, wherein the core refractive index decreases monotonically from a core center to a maximum at between 0.5 and 0.75 times a width or length of the rectangular cross-section.

16. The solid optical waveguide of claim 10, wherein the core refractive index decreases non-monotonically from the core center to a core/cladding interface so as to form a spot-stabilized waveguide with respect to input beam displacements along at least one axis.

17. A diode pumped solid state laser, comprising:
a pump laser array configured to produce a pump beam; and
the optical fiber of claim 1 situated to receive the pump beam and direct the pump beam to a solid state laser material.

18. The diode pumped solid state laser of claim 17, further comprising a beam shaping optical system configured to receive the pump beam from the optical fiber and direct the shaped pump beam to the solid state laser material.

19. The diode pumped solid state laser of claim 18, further comprising at least one fiber optic connector configured to retain the optical fiber so as to receive the pump beam or couple the pump beam to the beam shaping optical system.

20. The diode pumped solid state laser of claim 18, wherein the optical fiber has a core diameter of 125 μm to 500 μm, and a refractive index difference associated with a radial coordinate $r_{max}$ and the core center is less than about 0.01, and $r_{max}$ is between 0.25 $r_{core}$ and 0.75 $r_{core}$, wherein $r_{core}$ is a core radius.

21. A solid optical waveguide, comprising:
a core; and
a cladding surrounding the core, wherein a core refractive index decreases non-monotonically from a core center to a core/cladding interface so as to form a spot-stabilized waveguide with respect to input beam displacements along at least one axis.

22. The solid optical waveguide of claim 21, wherein the core has a rectangular cross section having an aspect ratio of between 1 and 5.

23. The solid optical waveguide of claim 21, wherein the core refractive index decreases non-monotonically from the core center to the core/cladding interface along a direction parallel to a length or width of the rectangular cross section.

24. The solid optical waveguide of claim 21, wherein a total variation in core refractive index is less than 0.05.

25. The solid optical waveguide of claim 21, wherein the core and cladding are silica.

26. The solid optical waveguide of claim 21, wherein the core refractive index decreases monotonically from a core center to a maximum at between 0.5 and 0.75 times a width or length of the rectangular cross-section.

27. A solid optical waveguide, comprising:
a core; and
a cladding surrounding the core, wherein a core refractive index decreases continuously and non-monotonically from a core center to a core/cladding interface, wherein the core refractive index decreases non-monotonically from the core center to a core/cladding interface so as to form a spot-stabilized waveguide with respect to input beam displacements along at least one axis.

* * * * *